(12) United States Patent
Choo et al.

(10) Patent No.: US 12,444,450 B2
(45) Date of Patent: Oct. 14, 2025

(54) MEMORY DEVICE AND METHOD FOR MANAGING DYNAMIC VOLTAGE FREQUENCY SCALING OPERATIONS BASED ON HOST CONFIGURATION

(71) Applicant: SAMSUNG ELECTRONICS CO., LTD., Suwon-si (KR)

(72) Inventors: Chul-Hwan Choo, Hwaseong-si (KR); Jun Ha Hwang, Seoul (KR); Doo Hee Hwang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 17/814,640

(22) Filed: Jul. 25, 2022

(65) Prior Publication Data

US 2023/0154509 A1 May 18, 2023

(30) Foreign Application Priority Data

Nov. 16, 2021 (KR) .......... 10-2021-0157904
Jan. 18, 2022 (KR) .......... 10-2022-0007242

(51) Int. Cl.
*G11C 5/14* (2006.01)
*G06F 1/3234* (2019.01)
(Continued)

(52) U.S. Cl.
CPC ............ *G11C 7/222* (2013.01); *G06F 1/3275* (2013.01); *G06F 1/3296* (2013.01); *G11C 5/14* (2013.01); *G11C 7/1048* (2013.01); *G11C 7/109* (2013.01)

(58) Field of Classification Search
CPC .... G06F 1/3225; G06F 1/3275; G06F 1/3296; G11C 11/4074; G11C 5/14; G11C 5/147;
(Continued)

(56) References Cited

U.S. PATENT DOCUMENTS 8,874,947 B2 10/2014 Rotem et al.
9,619,240 B2 4/2017 Kruglick
(Continued)

FOREIGN PATENT DOCUMENTS

KR 10-2014-0078394 6/2014
KR 10-2014-0111896 9/2014
(Continued)

OTHER PUBLICATIONS

Brett Murdock, "Advantages of LPDDR5: A New Clocking Scheme", Semiconductor Engineering, Sep. 5, 2019 (Sep. 5, 2019) pp. 1-18.
(Continued)

*Primary Examiner* — Alexander Sofocleous
*Assistant Examiner* — James S Wells
(74) *Attorney, Agent, or Firm* — MORGAN, LEWIS & BOCKIUS LLP

(57) ABSTRACT

A memory device includes a memory cell for storing data, and a memory controller configured to check whether a dynamic voltage frequency scaling core (DVFSC) operation is used, check information stored in the memory device indicating a setting of the host device in response to the DVFSC operation being used, determine a level of a low voltage used for the DVFSC operation based on the information, and transmit the determined level of the low voltage used for the DVFSC operation to the host device.

20 Claims, 12 Drawing Sheets

(51) Int. Cl.
  *G06F 1/3296* (2019.01)
  *G11C 7/10* (2006.01)
  *G11C 7/22* (2006.01)

(58) Field of Classification Search
  CPC ..... G11C 7/1045; G11C 7/1048; G11C 7/109; G11C 7/222
  USPC ........................................................ 365/233.1
  See application file for complete search history.

(56) References Cited

U.S. PATENT DOCUMENTS

| | | | |
|---|---|---|---|
| 9,632,520 | B2 | 4/2017 | Park et al. |
| 9,733,684 | B2 | 8/2017 | Choi et al. |
| 2009/0150602 | A1* | 6/2009 | Sauber ................. G06F 1/3275 711/E12.083 |
| 2010/0077267 | A1* | 3/2010 | Perego ................ G06F 13/1684 714/716 |
| 2010/0138684 | A1 | 6/2010 | Kim et al. |
| 2010/0250981 | A1 | 9/2010 | Pamley et al. |
| 2017/0115915 | A1 | 4/2017 | Byun |
| 2017/0169875 | A1* | 6/2017 | Gans .................. G11C 11/4074 |
| 2017/0228186 | A1 | 8/2017 | Healy et al. |
| 2017/0294216 | A1* | 10/2017 | Doo ........................ G06F 1/324 |
| 2018/0130506 | A1 | 5/2018 | Kang et al. |
| 2018/0348838 | A1 | 12/2018 | Cox et al. |
| 2018/0373314 | A1 | 12/2018 | Stewart et al. |
| 2019/0027206 | A1 | 1/2019 | Kim et al. |
| 2019/0129637 | A1* | 5/2019 | Gans .................... G11C 7/1072 |
| 2020/0143850 | A1 | 5/2020 | Kim |
| 2020/0334119 | A1 | 10/2020 | Lim |
| 2021/0065772 | A1* | 3/2021 | Suh ........................ G06F 1/324 |
| 2021/0103328 | A1* | 4/2021 | Oh ............................ G11C 7/20 |
| 2021/0182223 | A1 | 6/2021 | Choi et al. |

FOREIGN PATENT DOCUMENTS

| | | |
|---|---|---|
| KR | 10-2015-0106635 | 9/2015 |
| KR | 10-2017-0124017 | 11/2017 |
| WO | 2013100909 | 7/2013 |
| WO | 2017209835 | 7/2017 |

OTHER PUBLICATIONS

EP Search Report Issued Aug. 3, 2023 in Corresponding Appln. No. EP 22 192 772.6.
EP 1st OA Issued Aug. 16, 2023 in Corresponding Appln. No. EP 22 192 772.6.
EP Partial Search Report Dated Apr. 14, 2023 in Corresponding EP Appln. No. EP 22 192 772.6.

* cited by examiner

FIG. 7

| Mode | Host Setting | | | VDD2L |
|---|---|---|---|---|
| | RDBI | CK : WCK | Org. | |
| Mode 1 | on | 1:4 | X16 | V1 |
| Mode 2 | off | 1:2 | X16 | V2 |
| Mode 3 | off | 1:2 | X8 | V3 |

MEMORY DEVICE AND METHOD FOR MANAGING DYNAMIC VOLTAGE FREQUENCY SCALING OPERATIONS BASED ON HOST CONFIGURATION

This application claims priority under 35 U.S.C. 119 to Korean Patent Application No. 10-2021-0157904, filed on Nov. 16, 2021 and Korean Patent Application No. 10-2022-0007242, filed on Jan. 18, 2022 in the Korean Intellectual Property Office, the disclosures of which are incorporated by reference in their entirety herein.

BACKGROUND

1. Field

The present disclosure relates to a memory device, a method of driving the memory device, and a method of driving a host device.

2. Description of Related Art

A dynamic voltage frequency scaling (DVFS) technique may be used to reduce power consumption of a semiconductor device including a memory device. The DVFS technique is a technique of changing an operating clock frequency in a chip or changing the magnitude of a driving voltage.

For example, voltages used in a memory device such as a dynamic random access memory (DRAM) may include an input/output (I/O) voltage (e.g., VDDQ) and a core voltage (e.g., VDD1, VDD2H, or VDD2L).

Dynamic voltage frequency scaling core (DVFSC), a technology that uses the DVFS technique for the core voltage, may be used to reduce power of a memory device. It is possible to reduce power consumption of a system including a memory device by lowering the level of the core voltage to VDD2L using the DVFSC in a low frequency band.

However, when the DVFSC is performed without considering a driving environment with a host device, the operating performance of the memory device may be degraded.

SUMMARY

One or more embodiments of the present disclosure provide a memory device with improved operating reliability, a method of driving the memory device, and a method of driving a host device.

According to an embodiment of the present disclosure, there is provided a memory device that includes a memory cell for storing data, and a memory controller configured to check whether a dynamic voltage frequency scaling core (DVFSC) operation is used, check information stored in the memory device indicating a setting of a host device in response to the DVFSC operation being used, determine a level of a low voltage used for the DVFSC operation based on the information, and transmit the determined level of the low voltage used for the DVFSC operation to the host device.

According to an embodiment of the present disclosure, there is provided a method of driving a memory device, the method includes the memory device receiving a request for a level of a low voltage used for a DVFSC operation from a host device, the memory device determining the level of the low voltage based on information indicating a setting of the host device and transmitting the level of the low voltage used for the DVFSC operation, and the memory device transmitting the determined low level of the low voltage used for the DVFSC operation to the host device.

According to an embodiment of the present disclosure, there is provided a method of driving a host device, the method includes the host transmitting a request for a level of a low voltage used for a DVFSC operation to a memory device, and the host receiving the level of the low voltage used for the DVFSC operation in response to the request. The level is determined based on information stored on the memory device indicating a setting of the host device.

BRIEF DESCRIPTION OF THE DRAWINGS

These and/or other aspects will become apparent and more readily appreciated from the following description of the embodiments, taken in conjunction with the accompanying drawings in which:

FIG. 7 is a diagram for explaining operations illustrated in FIG. 6;

DETAILED DESCRIPTION

Hereinafter, embodiments according to the technical spirit of the present disclosure will be described with reference to the accompanying drawings.

Figure 1:
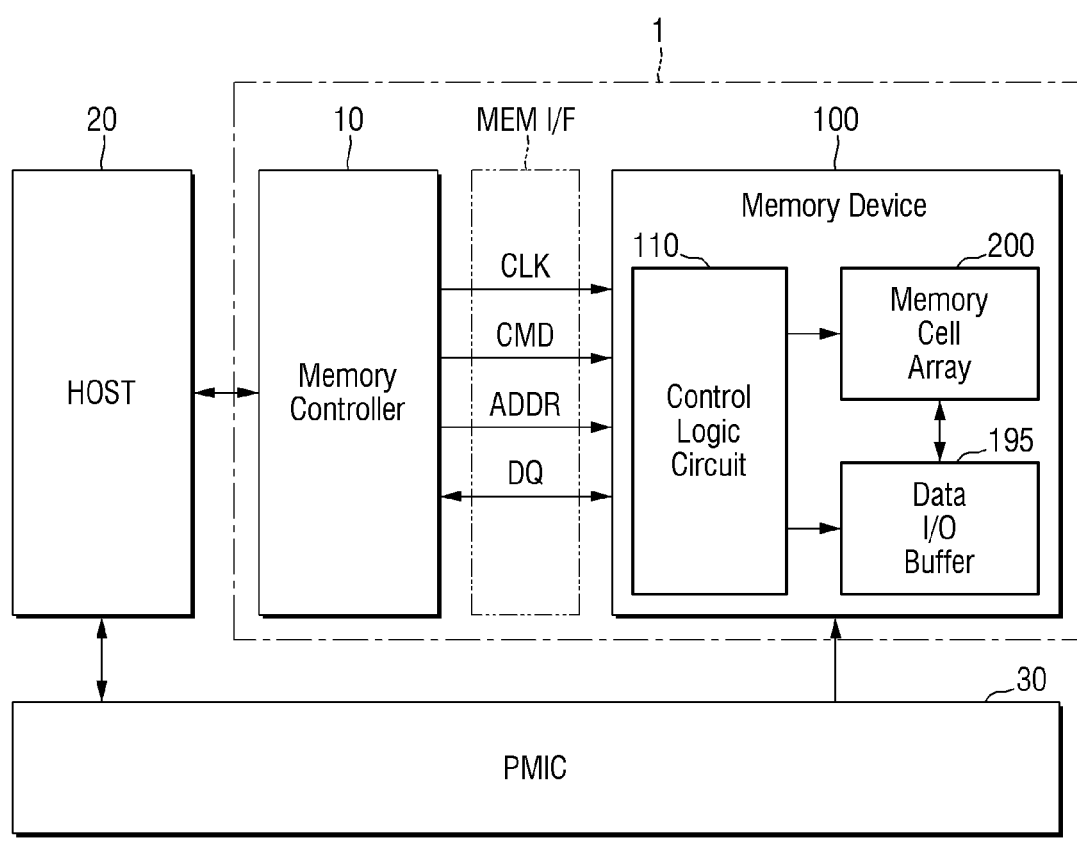
FIG. 1 is a block diagram of a memory system according to an example embodiment.
Figure 2:
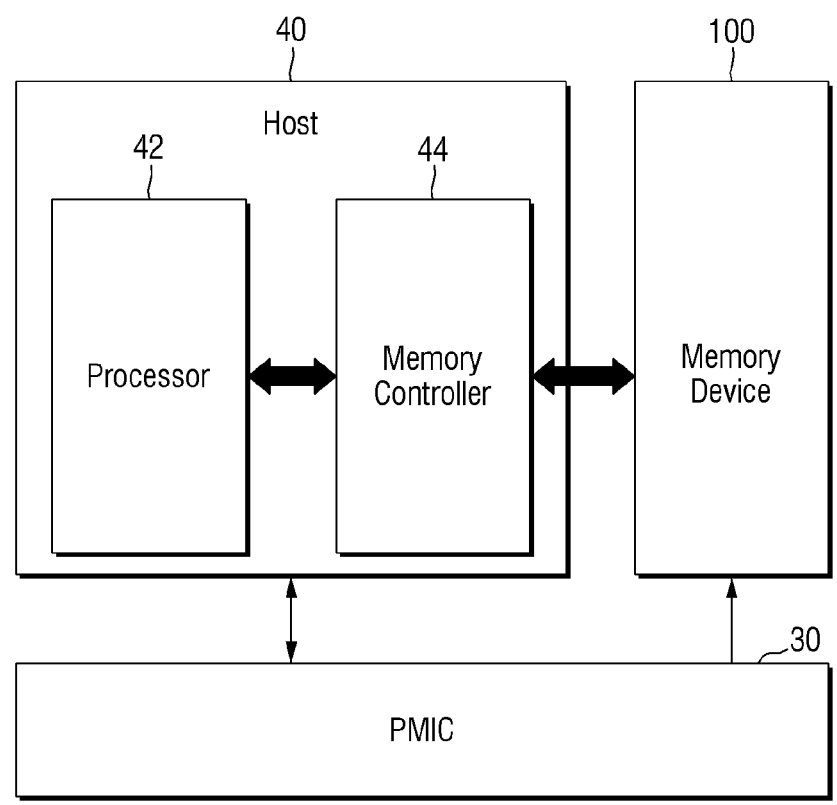
FIG. 2 is a block diagram of a memory system according to an example embodiment.

FIG. 1 is a block diagram of a memory system according to an example embodiment. FIG. 2 is a block diagram of a memory system according to an example embodiment.

Referring to FIG. 1, the memory system may include a host device 20 and a memory storage device 1. The memory storage device 1 may include a memory device 100 and a memory controller 10 (e.g., a control circuit).

The memory controller 10 may control the overall operation of the memory device 100. For example, the memory controller 10 may control data exchange between the external host device 20 and the memory device 100. For example, the memory controller 10 may control the memory device 100 according to a read/write request from the host device 20.

The memory controller 10 and the memory device 100 may communicate through a memory interface MEM I/F. In addition, the memory controller 10 and the external host device 20 may communicate through a host interface. That is, the memory controller 10 may relay signals between the memory device 100 and the host device 20.

The memory controller 10 may control the operation of the memory device 100 by transmitting a command CMD for controlling the memory device 100. Here, the memory device 100 may include dynamic memory cells. For example, the memory device 100 may include a dynamic random access memory (DRAM), a double data rate 4 (DDR4) synchronous DRAM (SDRAM), a low power DDR4 (LPDDR4) SDRAM, or a low power double data rate 5 (LPDDR5) SDRAM. However, embodiments of the present disclosure are not limited thereto, and the memory device 100 may also include a nonvolatile memory device.

The memory device 100 may include a memory cell array 200 in which data is stored, a control logic circuit 110, and a data input/output (I/O) buffer 195.

A case where the memory device 100 is a DRAM which is one of volatile memory devices will be described below as an example. For example, the DRAM may be a DRAM operating according to a Joint Electron Device Engineering Council (JEDEC) LPDDR5 standard, but embodiments of the inventive concept are not limited thereto.

The memory controller 10 may transmit a clock signal CLK, the command CMD, an address ADDR, etc. to the memory device 100. The memory controller 10 may provide data to the memory device 100 through a DQ port DQ and may receive data from the memory device 100 through the DQ port DQ.

A power management integrated circuit (IC) 30 may provide a voltage to the memory device 100.

In an embodiment, the power management IC 30 may receive information about a level of a voltage used for a dynamic voltage frequency scaling core (DVFSC) operation from the host device 20 and provide a corresponding voltage level to the memory device 100.

The voltage used for the DVFSC operation is a core voltage, and examples of the core voltage include VDD1, VDD2H, and VDD2L. Here, VDD1 may be a voltage for driving word lines of the memory cell array 200, and VDD2H and VDD2L may be voltages for driving circuits included in the memory device 100. Here, VDD2H may have a higher voltage level than VDD2L, and VDD1 may have a higher voltage level than VDD2H and VDD2L.

Here, VDD2L is a voltage used when the memory device 100 operates at low speed to reduce power. In an embodiment, when the memory device 100 or the memory storage device 10 determines an appropriate voltage level of VDD2L based on information about a data transmission/reception environment, the host device 20 controls the power management IC 30 to provide the determined voltage level of VDD2L to the memory device 100.

Although the memory controller 10 is separate from the host device 20 in FIG. 1, embodiments of the inventive concept are not limited thereto.

Referring to FIG. 2, a host device 40 may include a processor 42 and a memory controller 44 (e.g., a control circuit). The processor 42 may control the overall operation of an electronic system, in particular, may control the operation of each component constituting the electronic system. The processor 42 may be implemented as a general-purpose processor or may be implemented as a dedicated processor or an application processor. The processor 42 may include one or more central processing unit (CPU) cores and may be connected to the memory controller 44.

According to some embodiments, the processor 42 may further include an accelerator block which is a dedicated circuit for performing a high-speed data operation such as an artificial intelligence (AI) data operation. The accelerator block may include an operation block such as a graphic processing unit (GPU), a neural processing unit (NPU) and/or a data processing unit (DPU). The accelerator block may be included in the processor 42 or may be implemented as a physically independent separate chip according to another example.

In an embodiment, the memory controller 44 may be disposed in the host device 40. In this embodiment, a memory device 100 may determine an appropriate voltage level of VDD2L based on information about the data transmission/reception environment with the host device 40 and control a power management IC 30 to provide the determined voltage level of VDD2L to the memory device 100.

The host device 40 may communicate with the memory device 100 based on one of a plurality of standards such as double data rate (DDR), low power double data rate (LPDDR), graphics double data rate (GDDR), wide I/O, high bandwidth memory (HBM), hybrid memory cube (HMC), and compute eXpress link (CXL).

Figure 3:
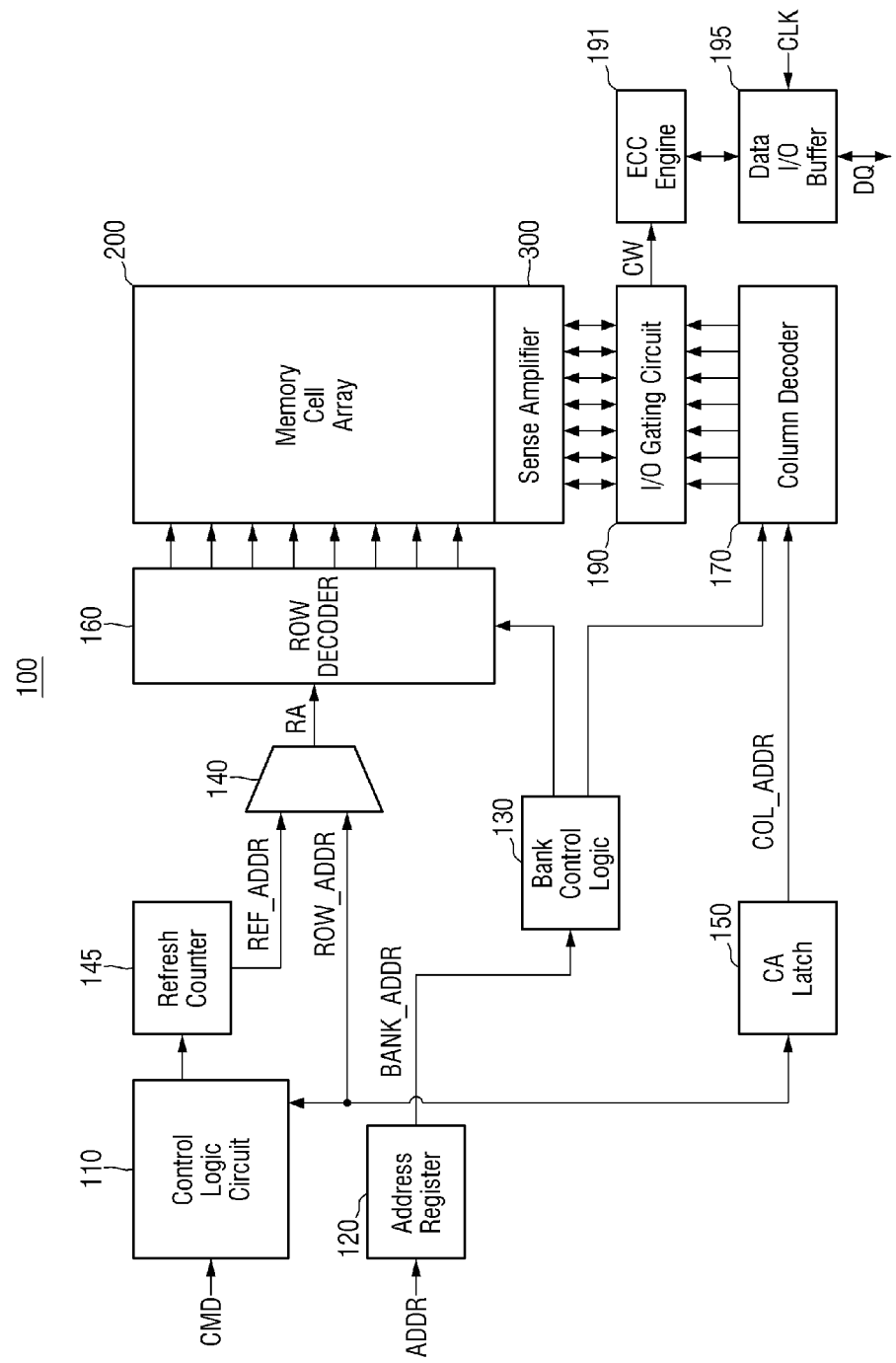
FIG. 3 is a block diagram of a memory device of FIG. 1.

FIG. 3 is a block diagram of the memory device 100 of FIG. 1 according to an example embodiment.

Referring to FIG. 3, the memory device 100 may include the control logic circuit 110, an address register 120, a bank control logic circuit 130, a row address multiplexer 140, a refresh counter 145, a column address latch 150, a row decoder 160 (e.g., a logic circuit), a column decoder 170 (e.g., a logic circuit), the memory cell array 200, a sense amplifier 300, an I/O gating circuit 190, an error correction code (ECC) engine 191 (e.g., a logic circuit), and the data I/O buffer 195.

The memory cell array 200 may include a plurality of bank memory arrays. The row decoder 160 may be connected to the bank memory arrays. The column decoder 170 may be connected to the bank memory arrays. The sense amplifier 300 may be connected to each of the bank memory arrays. The memory cell array 200 may include a plurality of word lines, a plurality of bit lines, and a plurality of memory cells formed at intersections of the word lines and the bit lines.

The address register 120 may receive the address ADDR from the memory controller 10. The address ADDR may include a bank address BANK_ADDR, a row address ROW_ADDR, and a column address COL_ADDR. The address register 120 may provide the bank address BANK_ADDR to the bank control logic circuit 130. The address register 120 may provide the row address ROW_ADDR to the row address multiplexer 140. The address register 120 may provide the column address COL_ADDR to the column address latch 150.

The bank control logic circuit 130 may generate a bank control signal in response to the bank address BANK_ADDR. The bank row decoder 160 may be activated in response to the bank control signal. In addition, the column decoder 170 may be activated in response to the bank control signal corresponding to the bank address BANK_ADDR.

The row address multiplexer 140 may receive the row address ROW_ADDR from the address register 120 and may receive a refresh row address REF_ADDR from the refresh counter 145. The row address multiplexer 140 may select one of the row address ROW_ADDR and the refresh row address REF_ADDR and output the selected address as a row address RA. The row address RA may be sent to the row decoder 160.

The refresh counter 145 (e.g., a counter circuit) may sequentially output the refresh row address REF_ADDR under the control of the control logic circuit 110.

The row decoder 160 activated by the bank control logic circuit 130 may decode the row address RA output from the row address multiplexer 140 and activate a word line corresponding to the row address RA. For example, the row decoder 160 may apply a word line driving voltage to the word line corresponding to the row address RA.

The column address latch 150 may receive the column address COL_ADDR from the address register 120 and temporarily store the received column address COL_ADDR. The column address latch 150 may gradually increase or increment the received column address COL_ADDR in a burst mode. The column address latch 150 may provide the temporarily stored column address COL_ADDR or the gradually increased column address COL_ADDR to the column decoder 170.

The column decoder 170 activated by the bank control logic circuit 130 among the column decoders may activate the sense amplifier 300 corresponding to the bank address BANK_ADDR and the column address COL_ADDR through a corresponding I/O gating circuit 190.

The I/O gating circuit 190 may include a circuit for gating I/O data, input data mask logic, read data latches for storing data output from the memory cell array 200, and write drivers for writing data to the memory cell array 200.

A code word CW read from a bank memory array of the memory cell array 200 may be sensed by the sense amplifier 300 corresponding to the bank memory array. In addition, the code word CW may be stored in a read data latch. The ECC engine 191 may perform ECC decoding on the code word CW stored in the read data latch. Data obtained by the ECC decoding may be provided to the memory controller 10 through the DQ port DQ via the data I/O buffer 195.

In a write operation, the data I/O buffer 195 may provide data to the ECC engine 191 based on the clock signal CLK. In a read operation, the data I/O buffer 195 may provide data received from the ECC engine 191 to the memory controller 10 through the DQ port DQ based on the clock signal CLK.

The memory cell array 200 may be connected to the sense amplifier 300, and the row decoder 160 and the column decoder 170 may be connected to the memory cell array 200 and the sense amplifier 300.

An operation of a memory device according to an example embodiment of the inventive concept will now be described with reference to FIGS. 4 through 9.

Figure 4:
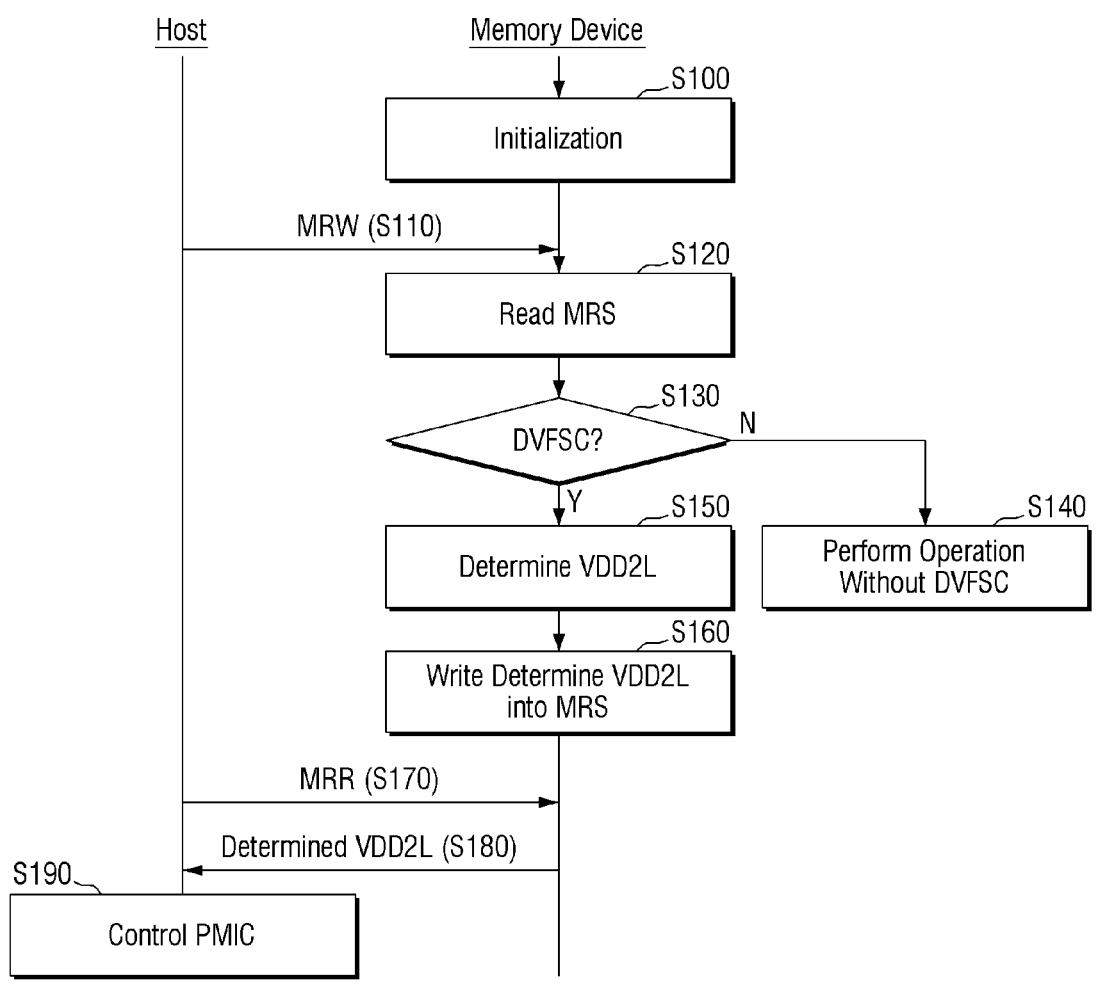
FIG. 4 is a flowchart illustrating the operation of a memory device according to an example embodiment.
Figure 5:
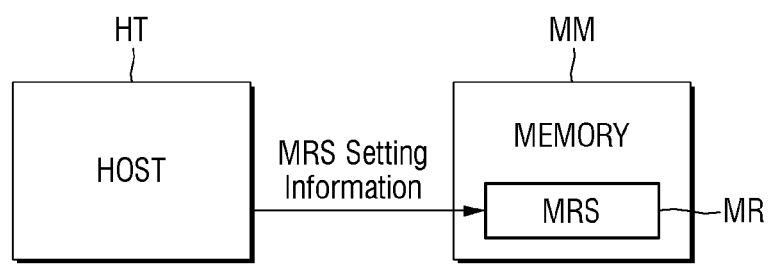
FIG. 5 is a diagram for explaining operations illustrated in FIG. 4.
Figure 6:
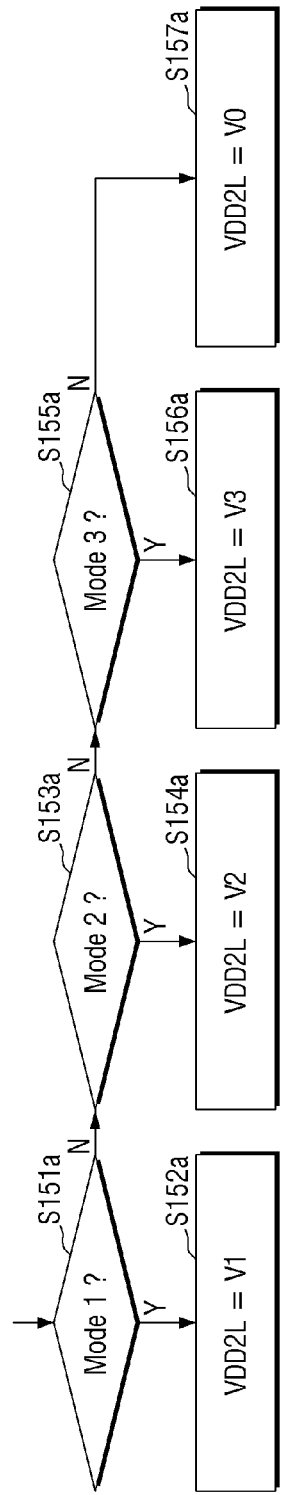
FIG. 6 is a flowchart illustrating a method of determining a low voltage used for a dynamic voltage frequency scaling core (DVFSC) operation according to an example embodiment.
Figure 8:
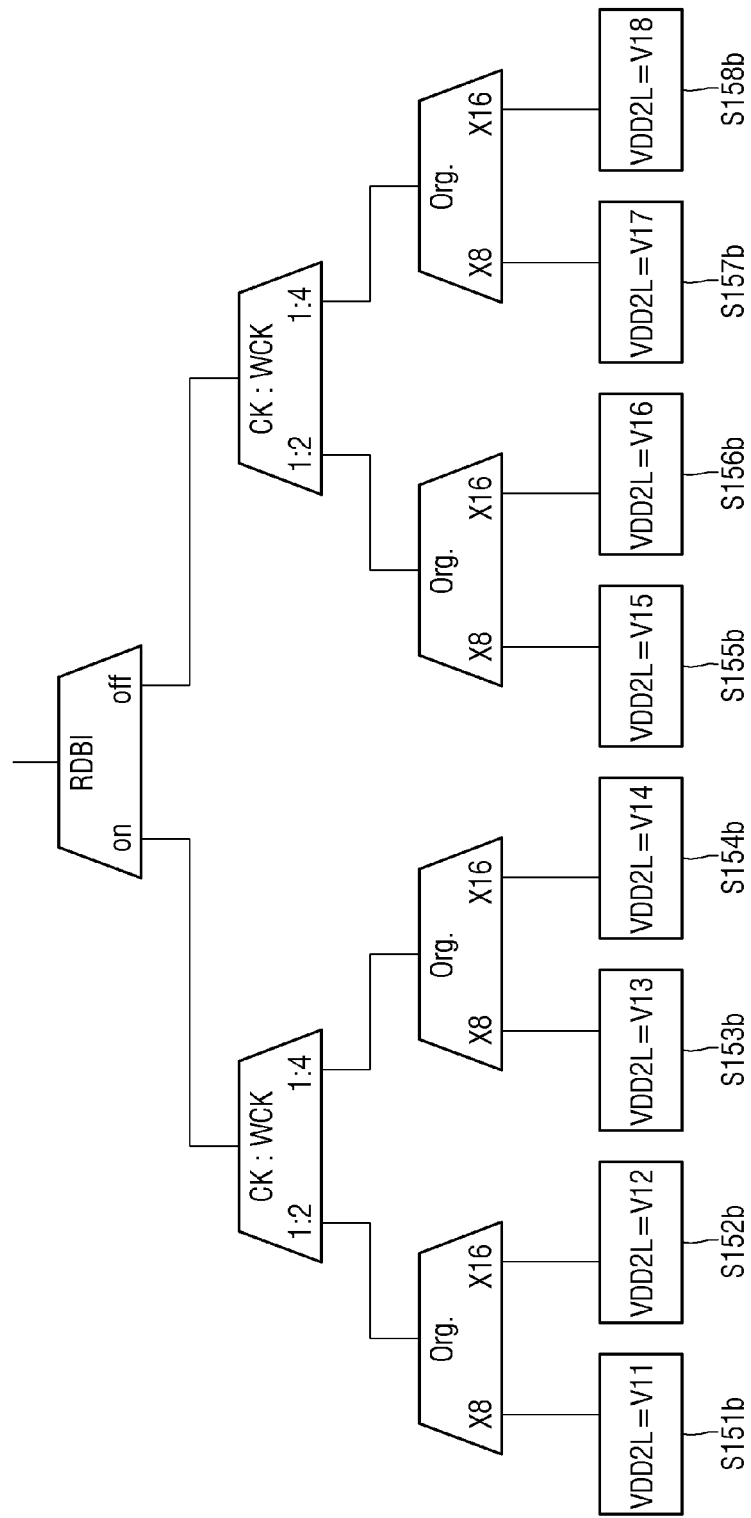
FIG. 8 is a diagram for explaining a method of determining a low voltage used for a DVFSC operation according to an example embodiment.
Figure 9:
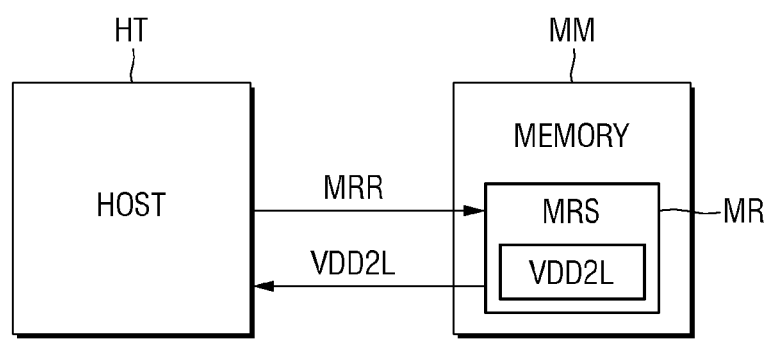
FIG. 9 is a diagram for explaining operations illustrated in FIG. 4.

FIG. 4 is a flowchart illustrating the operation of a memory device according to an embodiment of the inventive concept. FIG. 5 is a diagram for explaining operations illustrated in FIG. 4. FIG. 6 is a flowchart illustrating a method of determining a low voltage used for a DVFSC operation according to an example embodiment. FIG. 7 is a diagram for explaining operations illustrated in FIG. 6. FIG. 8 is a diagram for explaining a method of determining a low voltage used for a DVFSC operation according to an example embodiment. FIG. 9 is a diagram for explaining operations illustrated in FIG. 4.

In some embodiments, a memory device mentioned below may correspond to the memory storage device 1 of FIG. 1, and a host device mentioned below may correspond to the host device 20 of FIG. 1. In addition, in some embodiments, a memory device mentioned below may correspond to the memory device 100 of FIG. 2, and a host device mentioned below may correspond to the host device 40 of FIG. 2.

First, referring to FIG. 4, a memory device is initialized (operation S100). For example, initializing the memory device may include setting memory cells of the memory device to a certain state such as an erase state or a programming state.

Next, a host device sets a mode register set (MRS) of the memory device by using a mode register write (MRW) command (operation S110). For example, the setting of the MRS may include setting a value of a register within the memory device based on information within the MRW command or sent along with the MRW command. The set values may be referred to as a Host setting or information set by the Host on the memory device.

Referring to FIG. 5, when a system is initialized, a host device HT may store MRS setting information in an MRS (MR) of a memory MM by using an MRW command.

Here, the MRS setting information stored in the MRS (MR) of the memory device MM by the host device may include information about whether the DVFSC operation is used and information about a data transmission/reception environment between the host device and the memory device.

In some embodiments, the information about the data transmission/reception environment between the host device and the memory device may include information about whether read data bus inversion (RDBI) is used. That is, the information about the data transmission/reception environment between the host device and the memory device may include information about whether the memory device uses RDBI when decoding data received from the host device. In an example embodiment, when the RDBI is used, if the number of read data having a high level "H" is less than the number of data having a low level "L", the read data is output across the DQ ports as is, and if the number of data having a high level "H" is greater than the number of data having a low level "L", the read data is inverted and output across the DQ ports.

In some embodiments, the information about the data transmission/reception environment between the host device and the memory device may include a ratio of a first clock signal related to a command provided from the host device to a second clock signal related to data provided from the host device.

In an LPDDR5 DRAM, the first clock signal used to transmit a command and an address is distinguished from the second clock signal used to transmit data. The information about the data transmission/reception environment between the host device and the memory device may include information about the ratio of the first clock signal to the second clock signal.

In some embodiments, the information about the data transmission/reception environment between the host device and the memory device may include information about the number of DQ ports used for communication between the host device and the memory device.

Although some examples of the information about the data transmission/reception environment between the host device and the memory device have been described above, embodiments of the inventive concept are not limited thereto.

Next, referring to FIG. 4, the memory device reads the MRS (operation S120). For example, the reading may include reading one or more registers storing values of various settings. In an embodiment, the control logic circuit 110 performs operation S120.

The memory device may check the values of the various settings used for an operation of the memory device through the MRS reading operation. In addition, the memory device may check whether the DVFSC operation is to be used through the MRS reading operation and may check the information about the data transmission/reception environment between the host device and the memory device described above.

Next, it is checked whether the DVFSC operation is used (operation S130). In an embodiment, the control logic circuit 110 performs operation S130. For example, the control logic circuit 110 may determine whether the DVFSC operation is used by checking a value of a register that may have been previously set by the Host.

If the DVFSC operation is not used (operation S130-N), a memory operation is performed without the DVFSC operation (operation S140).

If the DVFSC operation is used (operation S130-Y), a low voltage VDD2L used for the DVFSC operation which does not degrade the operating performance of the memory device is determined (operation S150). In an embodiment, the control logic circuit 110 performs operation S150.

As described above, the DVFSC operation may be used to reduce power consumption of the entire system including the memory device. However, when the low voltage VDD2L used for the DVFSC operation is determined and used without consideration of the data transmission/reception environment between the host device and the memory device described above, the operating performance of some functional blocks included in the memory device may deteriorate, which, in turn, may lead to degradation of the operating performance of the entire memory device.

Methods of determining a low voltage VDD2L used for a DVFSC operation which can improve the operating reliability of a memory device will now be described with reference to FIGS. 6 through 8.

FIGS. 6 and 7 are diagrams for explaining a method of determining a low voltage VDD2L used for a DVFSC operation in consideration of a data transmission/reception operation mode between a host device (e.g., an application processor (AP)) and a memory device. For example, operation S150 may be performed by the method FIG. 6. For example, the control logic circuit 110 may perform the method of FIG. 6.

Referring to FIG. 6, it is determined whether the data transmission/reception operation mode between the host device and the memory device is a first mode (operation S151a).

Here, whether the data transmission/reception operation mode between the host device and the memory device is the first mode may be determined with reference to, for example, a table stored in the memory device illustrated in FIG. 7.

For example, in a data transmission/reception process between the host device and the memory device, if RDBI is used, a ratio of a first clock signal CK used to transmit a command and an address to a second clock signal WCK used to transmit data is 1:4, and the number of DQ ports used for communication is 16, the data transmission/reception operation mode between the host device and the memory device is the first mode. In an embodiment, the frequency of the second clock signal WCK is 4 times the frequency of the first clock signal CK during the first mode.

If the data transmission/reception operation mode between the host device and the memory device is the first mode (operation S151a-Y), a voltage level of the low voltage VDD2L used for the DVFSC operation is determined to be V1 (operation S152a).

In some embodiments, V1 may be a first voltage value, for example, about 0.95 V, but embodiments of the inventive concept are not limited thereto.

Next, if the data transmission/reception operation mode between the host device and the memory device is not the first mode (operation S151a-N), it is determined whether the data transmission/reception operation mode between the host device and the memory device is a second mode (operation S153a).

For example, in the data transmission/reception process between the host device and the memory device, if RDBI is not used, the ratio of the first clock signal CK used to transmit a command and an address to the second clock signal WCK used to transmit data is 1:2, and the number of DQ ports used for communication is 16, the data transmission/reception operation mode between the host device and the memory device is the second mode. In an embodiment, the frequency of the second clock signal WCK is 2 times the frequency of the first clock signal CK during the second mode.

If the data transmission/reception operation mode between the host device and the memory device is the second mode (operation S153a-Y), the voltage level of the low voltage VDD2L used for the DVFSC operation is determined to be V2 (operation S154a).

In some embodiments, V2 may be a second voltage value, for example, about 0.93 V, but embodiments of the inventive concept are not limited thereto.

Next, if the data transmission/reception operation mode between the host device and the memory device is not the second mode (operation S153a-N), it is determined whether the data transmission/reception operation mode between the host device and the memory device is a third mode (operation S155a).

For example, in the data transmission/reception process between the host device and the memory device, if RDBI is not used, the ratio of the first clock signal CK used to transmit a command and an address to the second clock signal WCK used to transmit data is 1:2, and the number of DQ ports used for communication is 8, the data transmission/reception operation mode between the host device and the memory device is the third mode. In an embodiment, the frequency of the second clock signal WCK is 2 times the frequency of the first clock signal CK during the third mode.

If the data transmission/reception operation mode between the host device and the memory device is the third mode (operation S155a-Y), the voltage level of the low voltage VDD2L used for the DVFSC operation is determined to be V3 (operation S156a).

In some embodiments, V3 may be a third voltage value, for example, about 0.9 V, but embodiments of the inventive concept are not limited thereto. In an embodiment, the first voltage value is higher than the second voltage value, and the second voltage value is higher than the third voltage value.

Next, if the data transmission/reception operation mode between the host device and the memory device is not the third mode (operation S155a-N), the voltage level of the low voltage VDD2L used for the DVFSC operation is determined to be V0 which is a default voltage level (operation S157a).

The data transmission/reception operation mode between the host device and the memory device may be determined according to, for example, the type of the host device.

Therefore, although only three operation modes are illustrated in FIG. 6, the number of data transmission/reception operation modes between the host device and the memory device, which is stored in the memory device, may be far greater than three.

Next, FIG. 8 is a diagram for explaining a method of determining a low voltage VDD2L used for a DVFSC operation in consideration of data transmission/reception operation conditions between a host device (e.g., an AP) and a memory device.

Referring to FIG. 8, in a data transmission/reception process between the host device and the memory device, if RDBI is used, a ratio of a first clock signal CK used to transmit a command and an address to a second clock signal WCK used to transmit data is 1:2, and the number of DQ ports used for communication is 8, a voltage level of the low voltage VDD2L used for the DVFSC operation is determined to be V11 (operation S151b).

In addition, in the data transmission/reception process between the host device and the memory device, if RDBI is used, the ratio of the first clock signal CK used to transmit a command and an address to the second clock signal WCK used to transmit data is 1:2, and the number of DQ ports used for communication is 16, the voltage level of the low voltage VDD2L used for the DVFSC operation is determined to be V12 (operation S152b).

In addition, in the data transmission/reception process between the host device and the memory device, if RDBI is used, the ratio of the first clock signal CK used to transmit a command and an address to the second clock signal WCK used to transmit data is 1:4, and the number of DQ ports used for communication is 8, the voltage level of the low voltage VDD2L used for the DVFSC operation is determined to be V13 (operation S153b).

In addition, in the data transmission/reception process between the host device and the memory device, if RDBI is used, the ratio of the first clock signal CK used to transmit a command and an address to the second clock signal WCK used to transmit data is 1:4, and the number of DQ ports used for communication is 16, the voltage level of the low voltage VDD2L used for the DVFSC operation is determined to be V14 (operation S154b).

In addition, in the data transmission/reception process between the host device and the memory device, if RDBI is not used, the ratio of the first clock signal CK used to transmit a command and an address to the second clock signal WCK used to transmit data is 1:2, and the number of DQ ports used for communication is 8, the voltage level of the low voltage VDD2L used for the DVFSC operation is determined to be V15 (operation S155b).

In addition, in the data transmission/reception process between the host device and the memory device, if RDBI is not used, the ratio of the first clock signal CK used to transmit a command and an address to the second clock signal WCK used to transmit data is 1:2, and the number of DQ ports used for communication is 16, the voltage level of the low voltage VDD2L used for the DVFSC operation is determined to be V16 (operation S156b).

In addition, in the data transmission/reception process between the host device and the memory device, if RDBI is not used, the ratio of the first clock signal CK used to transmit a command and an address to the second clock signal WCK used to transmit data is 1:4, and the number of DQ ports used for communication is 8, the voltage level of the low voltage VDD2L used for the DVFSC operation is determined to be V17 (operation S157b).

In addition, in the data transmission/reception process between the host device and the memory device, if RDBI is not used, the ratio of the first clock signal CK used to transmit a command and an address to the second clock signal WCK used to transmit data is 1:4, and the number of DQ ports used for communication is 16, the voltage level of the low voltage VDD2L used for the DVFSC operation is determined to be V18 (operation S158b).

Although only three examples of the information about the data transmission/reception environment between the host device and the memory device have been described above, embodiments of the inventive concept are not limited thereto, and more factors may be taken into consideration.

In an embodiment, the trapezoids illustrated in FIG. 8 represent multiplexers that are present in the control logic circuit 110 for performing the method of FIG. 6.

Referring back to FIG. 4, the memory device stores the determined voltage level of the low voltage VDD2L used for the DVFSC operation in the MRS (operation S160).

For example, referring to FIG. 9, the memory device MM may store the voltage level of the low voltage VDD2L used for the DVFSC operation, which is determined through the above process, in the MRS (MR).

Next, the host device requests the memory device to provide the determined voltage level of the low voltage VDD2L used for the DVFSC operation (operation S170). For example, the host device may send a request signal to the memory device indicating its desire to receive the present level of the low voltage VDD2L. The memory device transmits the voltage level of the low voltage VDD2L used for the DVFSC operation to the host device in response to the request (operation S180).

For example, referring to FIG. 9, the host device HT may request the voltage level of the low voltage VDD2L used for the DVFSC operation, which is stored in the memory device MM, by using a mode register read (MRR) command.

Then, the memory device MM may transmit the voltage level of the low voltage VDD2L used for the DVFSC operation to the host device HT in response to the request.

Referring back to FIG. 4, the host device receiving the voltage level of the low voltage VDD2L used for the DVFSC operation controls a power management IC (30 of FIG. 1) to provide a voltage having the determined voltage level of the low voltage VDD2L to the memory device (operation S190).

In an embodiment, the memory device determines the low voltage VDD2L used for the DVFSC operation in consideration of the data transmission/reception environment between the host device and the memory device and transmits the determined low voltage VDD2L to the host device. Accordingly, the memory device is provided with the determined low voltage VDD2L. Therefore, the operating performance of functional blocks included in the memory device is not degraded. That is, the operating reliability of the memory device can be improved even during the DVFSC operation for power reduction.

Figure 10:
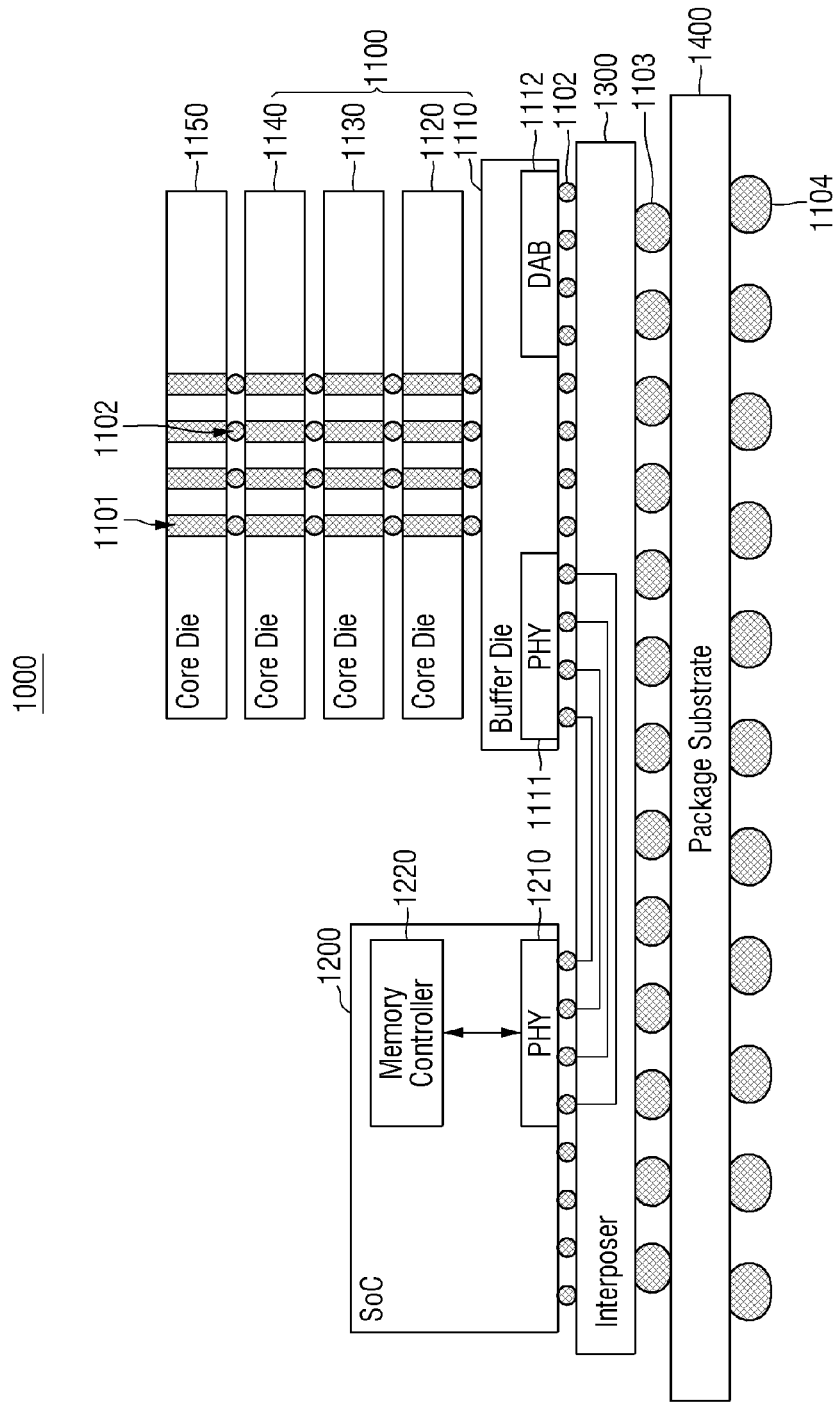
FIG. 10 illustrates a semiconductor package according to an example embodiment.

FIG. 10 illustrates a semiconductor package 1000 according to an example embodiment.

Referring to FIG. 10, the semiconductor package 1000 may include a stacked memory device 1100, a system on chip 1200 (SoC), an interposer 1300, and a package substrate 1400. The stacked memory device 1100 may include a buffer die 1110 and core dies 1120 through 1150.

Each of the core dies 1120 through 1150 may include a memory cell array. The core dies 1120 through 1150 may include the memory device described above. The buffer die 1110 may include a physical layer 1111 and a direct access block (DAB) 1112. The physical layer 1111 may be electrically connected to a physical layer 1210 of the SoC 1200 through the interposer 1300. The stacked memory device 1100 may receive signals from the SoC 1200 or transmit signals to the SoC 1200 through the physical layer 1111.

The DAB 1112 may provide an access path for testing the stacked memory device 1100 without via the SoC 1200. The DAB 1112 may include a conductive member (e.g., a port or a pin) that can directly communicate with an external test device. A test signal and data received through the DAB 1112 may be transmitted to the core dies 1120 through 1150 through through-silicon vias (TSVs) 1101. Data read from the core dies 1120 through 1150 to test the core dies 1120 through 1150 may be transmitted to the test device through the TSVs 1101 and the DAB 1112. Accordingly, a direct access test for the core dies 1120 through 1150 may be performed.

The buffer die 1110 and the core dies 1120 through 1150 may be electrically connected to each other through the TSVs 1101 and bumps 1102. The buffer die 1110 may receive signals respectively provided to channels from the SoC 1200 through bumps 1102 respectively allocated to the channels. For example, the bumps 1102 may be micro-bumps.

The SoC 1200 may execute applications supported by the semiconductor package 1000 by using the stacked memory device 1100. For example, the SoC 1200 may include at least one of a CPU, an AP, a GPU, an NPU, a tensor processing unit (TPU), a vision processing unit (VPU), an image signal processor (ISP), and a digital signal processor (DSP) to execute specialized operations.

The SoC 1200 may include the physical layer 1210 and a memory controller 1220. The physical layer 1210 may include I/O circuits for transmitting and receiving signals to and from the physical layer 1111 of the stacked memory device 1100. The SoC 1200 may provide various signals to the physical layer 1111 through the physical layer 1210. The signals provided to the physical layer 1111 may be transmitted to the core dies 1120 through 1150 through interface circuits of the physical layer 1111 and the TSVs 1101. The memory controller 1220 may correspond to memory controller 44 and the stack memory device 1100 may correspond to memory device 100.

The memory controller 1220 may control the overall operation of the stacked memory device 1100. The memory controller 1220 may transmit signals for controlling the stacked memory device 1100 to the stacked memory device 1100 through the physical layer 1210. The memory controller 1220 may correspond to the memory controller 10 of FIG. 1.

The interposer 1300 may connect the stacked memory device 1100 and the SoC 1200. The interposer 1300 may connect the physical layer 1111 of the stacked memory device 1100 and the physical layer 1210 of the SoC 1200 and may provide physical paths formed using conductive materials. Accordingly, the stacked memory device 1100 and the SoC 1200 stacked on the interposer 1300 may transmit and receive signals to and from each other.

Bumps 1103 may be attached to an upper surface of the package substrate 1400, and solder balls 1104 may be attached to a lower surface of the package substrate 1400. For example, the bumps 1103 may be flip-chip bumps. The interposer 1300 may be attached onto the package substrate 1400 through the bumps 1103. The semiconductor package 1000 may transmit and receive signals to and from other external packages or semiconductor devices through the solder balls 1104. For example, the package substrate 1400 may be a printed circuit board (PCB).

Figure 11:
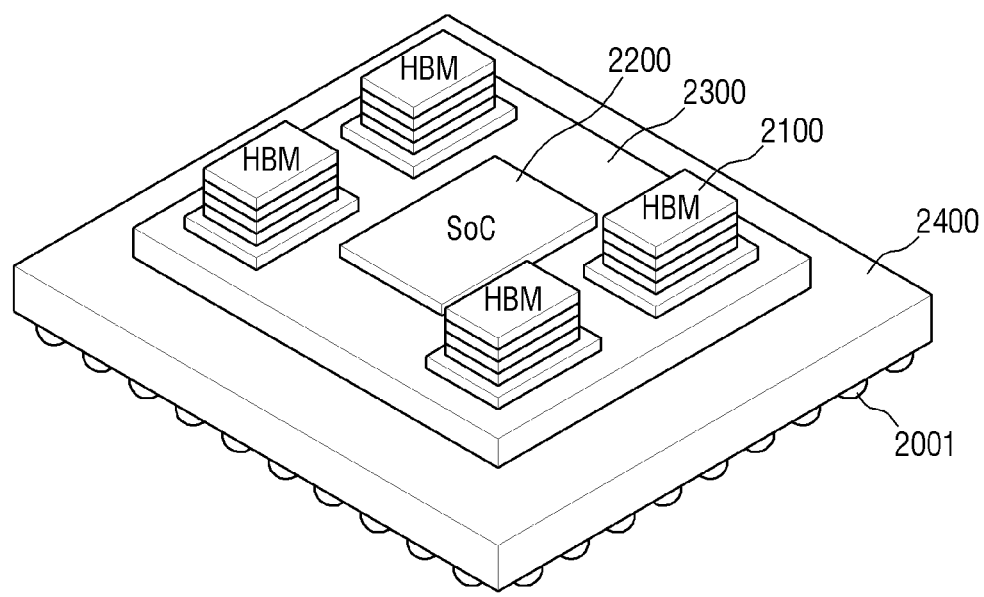
FIG. 11 illustrates an implementation example of a semiconductor package according to example embodiment.

FIG. 11 illustrates an implementation example of a semiconductor package 2000 according to an example embodiment.

Referring to FIG. 11, the semiconductor package 2000 may include a plurality of stacked memory devices 2100 and a SoC 2200. The stacked memory devices 2100 and the SoC 2200 may be stacked on an interposer 2300, and the interposer 2300 may be stacked on a package substrate 2400. The semiconductor package 2000 may transmit and receive signals to and from other external packages or semiconductor devices through solder balls 2001 attached to a lower surface of the package substrate 2400.

Each of the stacked memory devices 2100 may be implemented based on the HBM standard. However, the present disclosure is not limited thereto, and each of the stacked memory devices 2100 may also be implemented based on the GDDR, HMC, or wide I/O standard. Each of the stacked memory devices 2100 may correspond to the stacked memory device 1100 of FIG. 10.

The SoC 2200 may include at least one processor such as a CPU, an AP, a GPU or an NPU and a plurality of memory controllers for controlling the stacked memory devices 2100. The SoC 2200 may transmit and receive signals to and from each of the stacked memory devices 2100 through a corresponding memory controller. The SoC 2200 may correspond to the SoC 1200 of FIG. 10.

Figure 12:
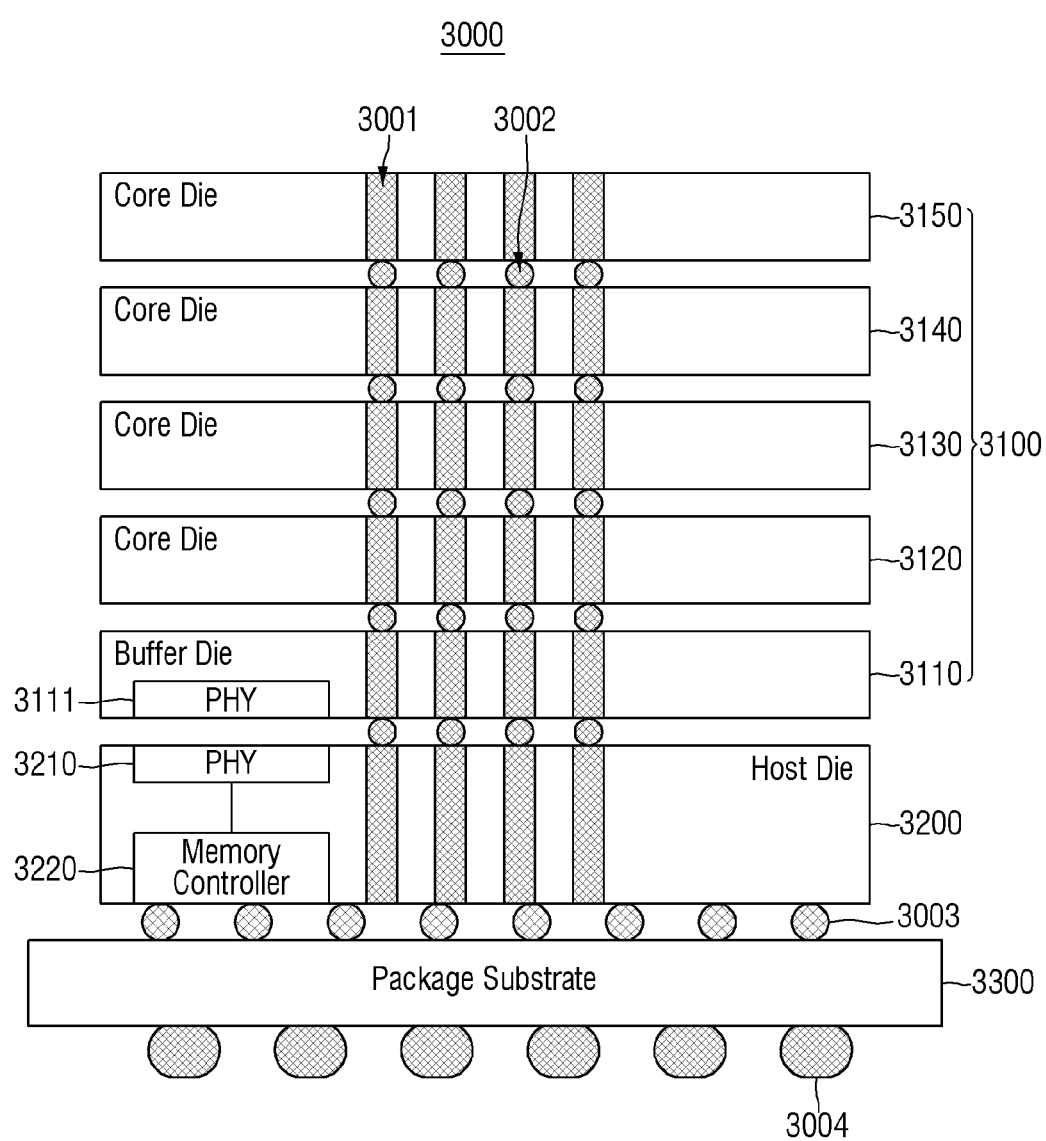
FIG. 12 illustrates a semiconductor package according to an example embodiment.

FIG. 12 illustrates a semiconductor package 3000 according to an example embodiment.

Referring to FIG. 12, the semiconductor package 3000 may include a stacked memory device 3100, a host die 3200, and a package substrate 3300. The stacked memory device 3100 may include a buffer die 3110 and core dies 3120 through 3150. The buffer die 3110 may include a physical layer 3111 for communicating with the host die 3200, and each of the core dies 3120 through 3150 may include a memory cell array.

The host die 3200 may include a physical layer 3210 for communicating with the stacked memory device 3100 and a memory controller 3220 for controlling the overall operation of the stacked memory device 3100. In addition, the host die 3200 may control the overall operation of the semiconductor package 3000 and may include a processor for executing an application supported by the semiconductor package 3000. For example, the host die 3200 may include at least one processor such as a CPU, an AP, a GPU, or an NPU.

The stacked memory device 3100 may be disposed on the host die 3200 based on TSVs 3001 and may be vertically stacked on the host die 3200. Accordingly, the buffer die 3110, the core dies 3120 through 3150, and the host die 3200 may be electrically connected to each other through the TSVs 3001 and bumps 3002 without an interposer. For example, the bumps 3002 may be micro-bumps.

Bumps 3003 may be attached to an upper surface of the package substrate 3300, and solder balls 3004 may be attached to a lower surface of the package substrate 3300. For example, the bumps 3003 may be flip-chip bumps. The host die 3200 may be stacked on the package substrate 3300 through the bumps 3003. The semiconductor package 3000 may transmit and receive signals to and from other external packages or semiconductor devices through the solder balls 3004. The host die 3200 may corresponds to the Host 40 and the stacked memory device 3100 may correspond to memory device 100.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims.

What is claimed is:

1. A memory device comprising:
   a memory cell array for storing data;
   a mode register;
   a table associated with operation modes of the memory device and operating voltages of the memory device corresponding to the operation modes respectively; and
   a control logic circuit configured to receive a command from a host device,
   wherein the memory device is configured to receive a mode register write command including information indicating at least one of the operation modes from the host device to set the mode register with the information in the memory device,
   write the determined level of the operating voltage into the mode register according to the mode register write command received from the host device,
   write the determined level of the operating voltage in the mode register according to the mode register write command received from the host device,
   receive a mode register read command from the host device, and
   transmit the determined level of the operating voltage to the host device according to the mode register read command received from the host device.

2. The memory device of claim 1, wherein the memory device reads the mode register to determine whether a dynamic voltage frequency scaling core (DVFSC) operation is used.

3. The memory device of claim 2, wherein the information indicates whether read data bus inversion (RDBI) is used.

4. The memory device of claim 2, wherein the information indicates a ratio of a first clock signal related to a command provided from the host device to a second clock signal related to data provided from the host device.

5. The memory device of claim 2, wherein the information indicates a number of DQ ports used for exchanging data with the host device.

6. The memory device of claim 1, wherein the memory device stores the determined level of the operating voltage used for a dynamic voltage frequency scaling core (DVFSC) operation in the mode register and receives a mode register read (MRR) command from the host device to read the determined level of the operating voltage used for the DVFSC operation, which is stored in the mode register.

7. The memory device of claim 1, wherein the memory device is provided with a supply voltage corresponding to the level of the operating voltage from an external power management IC (PMIC).

8. A system comprising:
   a memory device including a mode register indicating a voltage value corresponding to at least one of operation modes of the memory device; and
   a host device configured to write the at least one of operation modes of the memory device into the mode register and read the voltage value corresponding to the at least one of operation modes of the memory device from the mode register,
   the memory device configured to:
   receive a mode register write command including information indicating the at least one of the operation modes from the host device to write the information into the mode register of the memory device,
   determine a level of a voltage corresponding to the at least one of the operation modes based on the information in the mode register,
   receive a mode register read command from the host device to read the voltage value, and
   write the voltage value based on the level of the voltage determined by the memory device into the mode register,
   transmit the voltage value to the host device according to the mode register read command.

9. The system of claim 8, wherein the memory device reads the mode register to determine whether a dynamic voltage frequency scaling core (DVFSC) operation is used.

10. The system of claim 9, wherein the information indicates whether read data bus inversion (RDBI) is used.

11. The system of claim 9, wherein the information indicates a ratio of a first clock signal related to a command provided from the host device to a second clock signal related to data provided from the host device.

12. The system of claim 9, wherein the information indicates a number of DQ ports used for exchanging data with the host device.

13. The system of claim 8, wherein the memory device stores the determined level of the voltage used for a dynamic voltage frequency scaling core (DVFSC) operation in the mode register and receives a mode register read (MRR) command from the host device to read the determined level of the voltage used for the DVFSC operation, which is stored in the mode register.

14. The system of claim 8, wherein the memory storage device is provided with a power supply voltage for a dynamic voltage frequency scaling core (DVFSC) operation from an external power management IC (PMIC).

15. A method of operating a memory device, the method comprising:
    receiving a mode register write command including information indicating at least one of operation modes of the memory device from an external host device to write the information into a mode register in the memory device;
    determining a level of a voltage of the at least one of the operation modes based on the information in the mode register set;
    writing a voltage value based on the level of the voltage determined by the memory device into the mode register,
    receiving a mode register read command from the external host device to read the voltage value, and
    transmitting the voltage value in the mode register to the external host device according to the mode register read command.

16. The method of claim 15, further comprising reading the mode register to check the information indicating whether DVFSC operation is used.

17. The method of claim 16, wherein the information indicates whether read data bus inversion (RDBI) is used.

18. The method of claim 16, wherein the information indicates a ratio of a first clock signal related to a command provided from the external host device to a second clock signal related to data provided from the external host device.

19. The method of claim 16, wherein the information indicates a number of DQ ports used for exchanging data with the external host device.

20. The method of claim 15, further comprising:
receiving a power supply voltage corresponding to the voltage value for a dynamic voltage frequency scaling core (DVFSC) operation from an external power management IC (PMIC),
wherein the host device includes a memory controller configured to transmit the mode register write command and the mode register read command to the memory device.

\* \* \* \* \*